(12) United States Patent
Hirao

(10) Patent No.: US 6,185,330 B1
(45) Date of Patent: Feb. 6, 2001

(54) DEVICE AND RECORD MEDIUM FOR PATTERN MATCHING ENCODING/DECODING OF BINARY STILL IMAGES

(75) Inventor: Kouichirou Hirao, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/040,406

(22) Filed: Mar. 18, 1998

(30) Foreign Application Priority Data

Mar. 19, 1997 (JP) .................................................... 9-066945

(51) Int. Cl.$^7$ .............................. G06K 9/00; G06K 9/34; G06K 9/68; H04N 1/40
(52) U.S. Cl. ......................... 382/181; 382/173; 382/177; 382/218; 382/227; 358/467
(58) Field of Search .................................... 382/177, 181, 382/218, 227, 243, 238, 173; 358/426, 467

(56) References Cited

U.S. PATENT DOCUMENTS

| | | | |
|---|---|---|---|
| 4,581,760 | * 4/1986 | Schiller et al. | 382/124 |
| 4,606,069 | * 8/1986 | Johnsen | 382/243 |
| 4,901,363 | * 2/1990 | Toyokawa | 382/239 |
| 4,922,545 | * 5/1990 | Endoh et al. | 382/243 |
| 4,972,499 | * 11/1990 | Kurosawa | 382/227 |
| 5,303,313 | 4/1994 | Mark et al. | 382/243 |
| 5,751,859 | * 5/1998 | Howard | 382/237 |
| 5,920,658 | * 7/1999 | Yamagata et al. | 382/293 |

OTHER PUBLICATIONS

Howard, et al "Arithmetic Coding for Data Compression", IEEE, PP. 857–865, Jun. 1994.*

* cited by examiner

Primary Examiner—Phuoc Tran
Assistant Examiner—Daniel G. Mariam
(74) Attorney, Agent, or Firm—McGinn & Gibb, PLLC

(57) ABSTRACT

A pattern matching encoding device for executing pattern matching encoding of binary still images and a pattern matching decoding device corresponding to the pattern matching encoding device are proposed. In the pattern matching encoding, each input pattern extracted from the input image is matched against library patterns in the library, and the input pattern is encoded using a matched library pattern as a reference pattern if the matched library pattern is found. The pattern matching encoding device comprises a pattern segmentation section for segmenting each of selected library patterns and the input pattern into two or more parts and thereby generating segmented library patterns and segmented input patterns, a matching section for matching each of the segmented input patterns against corresponding segmented library patterns, and a pattern combination section for generating a new library pattern by combining the segmented library patterns each of which has matched one of the segmented input patterns. The new library pattern is regarded as the matched library pattern and the input pattern is encoded using the new library pattern as the reference pattern. According to the devices, compression rate of the input patterns by encoding can be increased faster.

20 Claims, 5 Drawing Sheets

F I G. 3
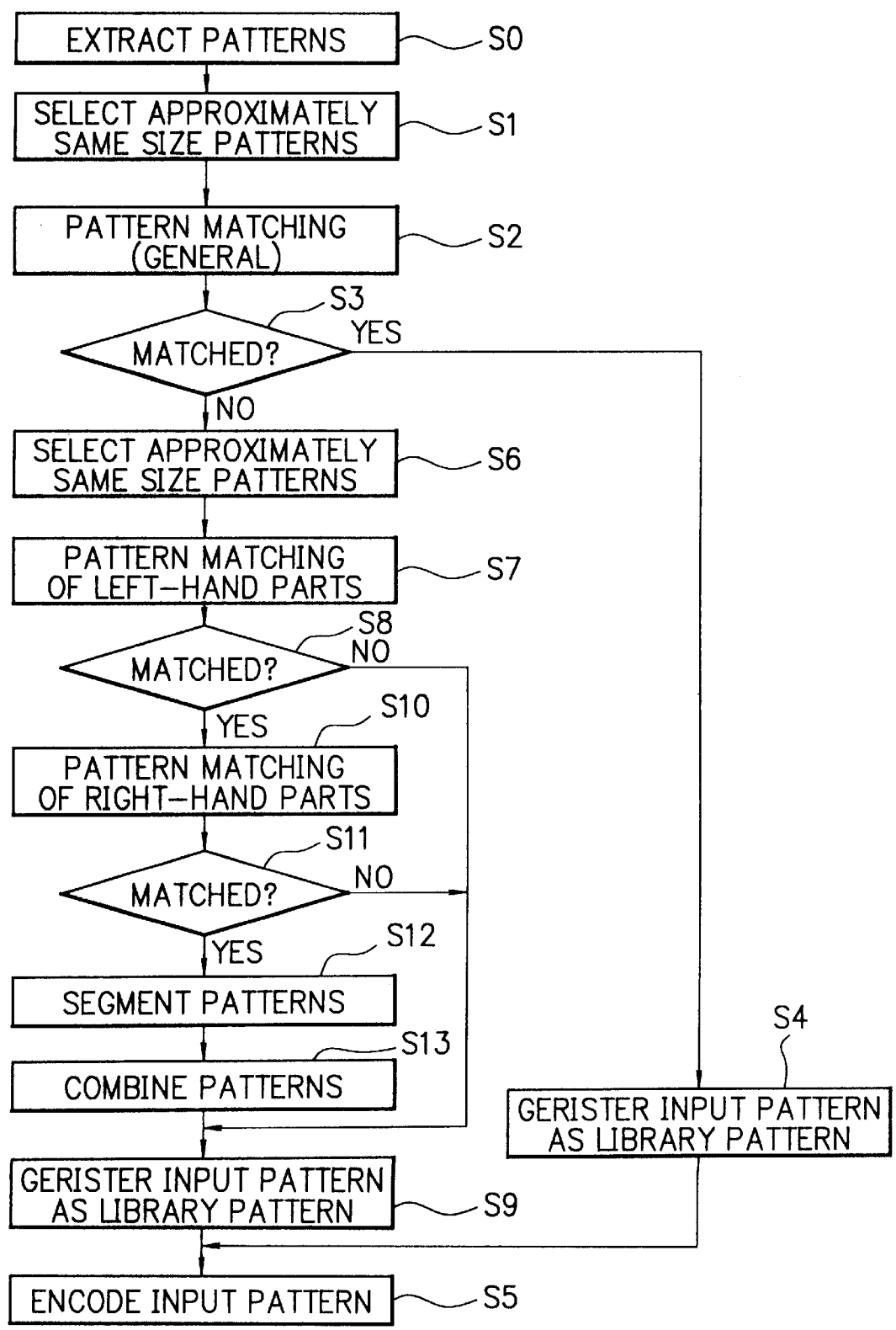

DEVICE AND RECORD MEDIUM FOR PATTERN MATCHING ENCODING/ DECODING OF BINARY STILL IMAGES

BACKGROUND OF THE INVENTION

The present invention relates to encoding/decoding of binary still images, and in particular, to a pattern matching encoding device for encoding binary still images, a pattern matching decoding device for decoding the encoded binary still images, and record mediums storing programs for pattern matching encoding and pattern matching decoding.

DESCRIPTION OF THE PRIOR ART

In pattern matching encoding (i.e. encoding of binary still images using pattern matching), an image to be encoded is segmented first into a plurality of groups of contiguous black pixels or into patterns corresponding to letters, numbers, symbols, etc., and pattern matching process is executed to each of the segmented pattern. Subsequently, encoding of the segmented patterns is executed by means of arithmetic coding according to the result of the pattern matching, in which bitmap information of the pattern itself along with information indicating the position and the size of the pattern is encoded.

In the arithmetic coding, pixels in the vicinity of a current or object pixel is utilized as reference pixels for predicting black/white of the current pixel, in which the hitting ratio of the prediction can be raised by utilizing a matched pattern as the reference pixels. As a result, encoding with high compression rate can be realized by the pattern matching encoding. The high compression rate encoding is usable for data transmission between facsimile machines etc.

FIG. 1 is a flow chart showing a conventional pattern matching encoding method which is disclosed in U.S. Pat. No. 5,303,313. In the method of FIG. 1, a plurality of patterns are extracted from an input image as input patterns (the 'symbols' in FIG. 1), in which every connected region of black pixels is extracted as an input pattern (steps U1, U2, U3). Each input pattern is matched against library patterns (the 'templates' in FIG. 1) (step U4). Here, the library composed of library patterns (i.e. templates) is generated from scratch as new input patterns are extracted. Therefore, each input pattern is matched against library patterns which have been created in the library so far. The input pattern is added to a matching template group if matching one exists in the library. If the input pattern matches none of the library patterns, the input pattern forms a new template group and serves as the library pattern (i.e. template) in that group so that later input patterns can be matched against it (step U5). In the encoding process, an input pattern which matched a library pattern in the library is encoded using the matched library pattern as a reference pattern (step U6, U7).

As described above, in the conventional pattern matching encoding, input patterns extracted from the input image are encoded by referring to the matched library pattern in the library. In the case where no matching library pattern is found for an input pattern, the input pattern is added to the library and is used for reference in the subsequent pattern matching encoding. Therefore, optimization of the library proceeds as the pattern matching encoding using the library is repeated. Conversely, a library with which few pattern matching encoding have been executed has not been optimized enough.

If the optimization of the library is insufficient, the number of library patterns which can be matched against the input pattern is small, and thus similarity between patterns is low and the matching rate is necessitated to be low. Consequently, the optimal library pattern to be referred to in the arithmetic coding can not be obtained, and hit rate of the pixel prediction remains low, and thus compression rate of the input pattern can not be increased.

The problem becomes critical as variety of input patterns increases. For example, when the input image is an English document, variety of characters (i.e. input patterns) to be processed is relatively low and the number of necessary library patterns can be relatively small, and thus the library tends to be easily optimized.

However, in the case where the input image is a Japanese document for example, a library storing library patterns for 'kanji' (Chinese characters with a large variety) as well as 'hiragana' (rounded Japanese alphabets) and 'katakana' (angular Japanese alphabets) has to be constructed to be usable.

In such cases, the optimization of the library takes longer, and thus the compression rate of the input patterns can not be increased rapidly.

SUMMARY OF THE INVENTION

It is therefore the primary object of the present invention to provide a pattern matching encoding device for encoding binary still images, by which the library storing the library patterns can be optimized faster with a smaller number of execution of the pattern matching encoding, thereby compression rate of the input patterns by encoding can be increased faster without needing a large number of the execution.

Another object of the present invention is to provide a computer-readable record medium storing a pattern matching encoding program for encoding binary still images, by which the library storing the library patterns can be optimized faster with a smaller number of execution of the pattern matching encoding, thereby compression rate of the input patterns by encoding can be increased faster without needing a large number of the execution.

Another object of the present invention is to provide a pattern matching decoding device which can decode the encoded binary still images which have been encoded by the pattern matching encoding device or by the computer operating according to the program stored in the computer-readable record medium.

Another object of the present invention is to provide a computer-readable record medium storing a pattern matching decoding program by which the encoded binary still images can be decoded.

In accordance with a first aspect of the present invention, there is provided a pattern matching encoding device for executing pattern matching encoding of binary still images in which each input pattern extracted from the input image is matched against library patterns which have been registered in the library so far and the input pattern is encoded using a matched library pattern as a reference pattern if the matched library pattern is found, comprising a library pattern selection means, a pattern segmentation means, a matching means, a pattern combination means, and an encoding means. The library pattern selection means selects library patterns which can be matched against the input pattern, from the library patterns which have been registered in the library so far. The pattern segmentation means segments each of the library patterns selected by the library pattern selection means and the input pattern into two or more parts and thereby generates segmented library patterns and segmented input patterns. The matching means matches each of the segmented input patterns against corresponding segmented library patterns. The pattern combination means generates a new library pattern by combining the segmented library patterns each of which has matched one of the segmented input patterns in the matching executed by the matching means. And the encoding means regards the new library pattern as the matched library pattern and encodes the input pattern using the new library pattern as the reference pattern.

In accordance with a second aspect of the present invention, in the first aspect, the pattern segmentation means segments each of the library patterns selected by the library pattern selection means and the input pattern into two parts.

In accordance with a third aspect of the present invention, in the second aspect, the pattern segmentation means segments each pattern into a ¼ left-hand part and a ¾ right-hand part.

In accordance with a fourth aspect of the present invention, in the first aspect, the input pattern is registered as a library pattern in the library.

In accordance with a fifth aspect of the present invention, in the first aspect, the new library pattern generated by the pattern combination means is registered as a library pattern in the library.

In accordance with a sixth aspect of the present invention, in the first aspect, the encoding means executes the encoding of the input pattern by means of arithmetic coding.

In accordance with a seventh aspect of the present invention, in the first aspect, the library pattern selection means selects library patterns which have approximately the same size as the input pattern.

In accordance with an eighth aspect of the present invention, in the first aspect, the encoding means further encodes numerical information concerning the input pattern.

In accordance with a ninth aspect of the present invention, in the eighth aspect, the numerical information includes the position and the size of the input pattern in the binary still image, a matching flag for indicating whether or not the input pattern has matched any of the library patterns, an index of a best-matched library pattern if the input pattern has matched some of the library patterns in general pattern matching, a generation flag for indicating whether or not the new library pattern has been generated by the pattern combination means, and indexes of the library patterns which have been used for generating the new library pattern if the new library pattern has been generated by the pattern combination means.

In accordance with a tenth aspect of the present invention, there is provided a computer-readable record medium storing a program for instructing a computer to execute processes for pattern matching encoding of binary still images in which each input pattern extracted from the input image is matched against library patterns which have been registered in the library so far and the input pattern is encoded using a matched library pattern as a reference pattern if the matched library pattern is found, in which the processes includes a library pattern selection process, a pattern segmentation process, a matching process, a pattern combination process, and an encoding process. In the library pattern selection process, library patterns which can be matched against the input pattern are selected from the library patterns which have been registered in the library so far. In the pattern segmentation process, each of the library patterns selected in the library pattern selection process and the input pattern are segmented into two or more parts and thereby segmented library patterns and segmented input patterns are generated. In the matching process, each of the segmented input patterns is matched against corresponding segmented library patterns. In the pattern combination process, a new library pattern is generated by combining the segmented library patterns each of which has matched one of the segmented input patterns in the matching process. And in the encoding process, the new library pattern is regarded as the matched library pattern and the input pattern is encoded using the new library pattern as the reference pattern.

In accordance with an eleventh aspect of the present invention, in the tenth aspect, each of the library patterns selected in the library pattern selection process and the input pattern are segmented into two parts in the pattern segmentation process.

In accordance with a twelfth aspect of the present invention, in the eleventh aspect, the segmentation in the pattern segmentation process is executed so as to segment each pattern into a ¼ left-hand part and a ¾ right-hand part.

In accordance with a thirteenth aspect of the present invention, in the tenth aspect, the processes further include a new library pattern registration process for registering the input pattern as a library pattern in the library.

In accordance with a fourteenth aspect of the present invention, in the tenth aspect, the processes further include a new library pattern registration process for registering the new library pattern generated in the pattern combination process as a library pattern in the library.

In accordance with a fifteenth aspect of the present invention, in the tenth aspect, the encoding of the input pattern is executed by means of arithmetic coding in the encoding process.

In accordance with a sixteenth aspect of the present invention, in the tenth aspect, library patterns which have approximately the same size as the input pattern are selected in the library pattern selection process.

In accordance with a seventeenth aspect of the present invention, in the tenth aspect, numerical information concerning the input pattern is further encoded in the encoding process.

In accordance with a eighteenth aspect of the present invention, in the seventeenth aspect, the numerical information includes the position and the size of the input pattern in the binary still image, a matching flag for indicating whether or not the input pattern has matched any of the library patterns, an index of a best-matched library pattern if the input pattern has matched some of the library patterns in general pattern matching, a generation flag for indicating whether or not the new library pattern has been generated in the pattern combination process, and indexes of the library patterns which have been used for generating the new library pattern if the new library pattern has been generated in the pattern combination process.

In accordance with a nineteenth aspect of the present invention, there is provided a pattern matching decoding device for executing pattern matching decoding of code which has been encoded by a pattern matching encoding means. The device includes a library pattern extraction means, a library pattern segmentation means, a library pattern combination means, and a decoding means. The library pattern extraction means extracts two or more library patterns from library patterns which have been registered in the library so far, according to information supplied from the pattern matching encoding means. The library pattern segmentation means segments each of the library patterns which have been extracted by the library pattern extraction means into two or more parts and thereby generates segmented library patterns. The library pattern combination means generates a new library pattern by combining the segmented library patterns which have been generated by the library pattern segmentation means, according to information supplied from the pattern matching encoding means. And the decoding means decodes the code which has been encoded by the pattern matching encoding means using the new library pattern as a reference pattern.

In accordance with a twentieth aspect of the present invention, there is provided a computer-readable record medium storing a program for instructing a computer to execute processes for pattern matching decoding of code which has been encoded by a pattern matching encoding means. The processes include a library pattern extraction process, a library pattern segmentation process, a library pattern combination process, and a decoding process. In the library pattern extraction process, two or more library patterns are extracted from library patterns which have been registered in the library so far, according to information supplied from the pattern matching encoding means. In the library pattern segmentation process, each of the library patterns which have been extracted in the library pattern extraction process is segmented into two or more parts and thereby segmented library patterns are generated. In the library pattern combination process, a new library pattern is generated by combining the segmented library patterns which have been generated in the library pattern segmentation process, according to information supplied from the pattern matching encoding means. And in the decoding process, the code which has been encoded by the pattern matching encoding means is decoded using the new library pattern as a reference pattern.

BRIEF DESCRIPTION OF THE DRAWINGS

The objects and features of the present invention will become more apparent from the consideration of the following detailed description taken in conjunction with the accompanying drawings, in which:

FIG. 3 is a flow chart showing the operation of the pattern matching encoding device of FIG. 2;

DESCRIPTION OF THE PREFERRED EMBODIMENTS

Figure 1:
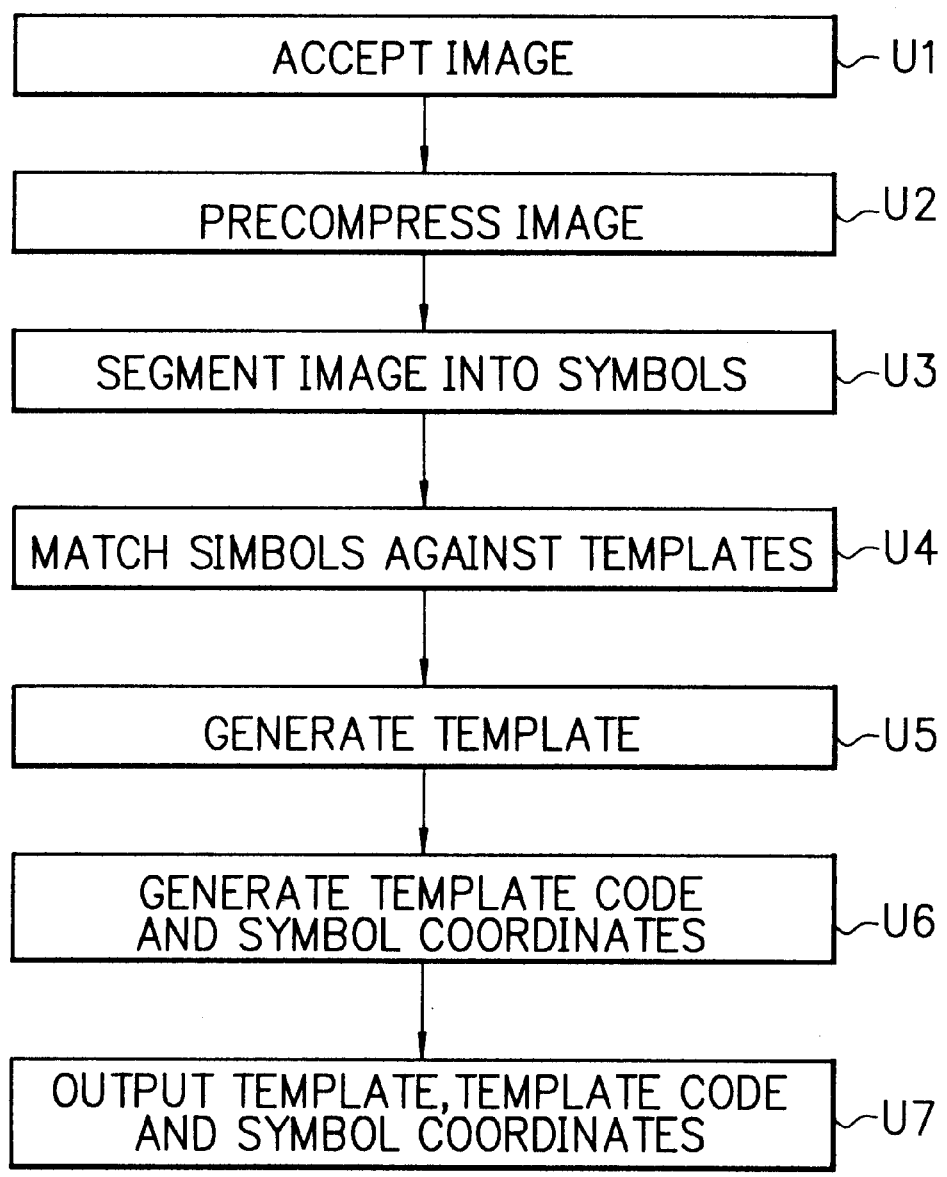
FIG. 1 is a flow chart showing a conventional pattern matching encoding method which is disclosed in U.S. Pat. No. 5,303,313.

Referring now to the drawings, a description will be given in detail of preferred embodiments in accordance with the present invention.

Figure 2:
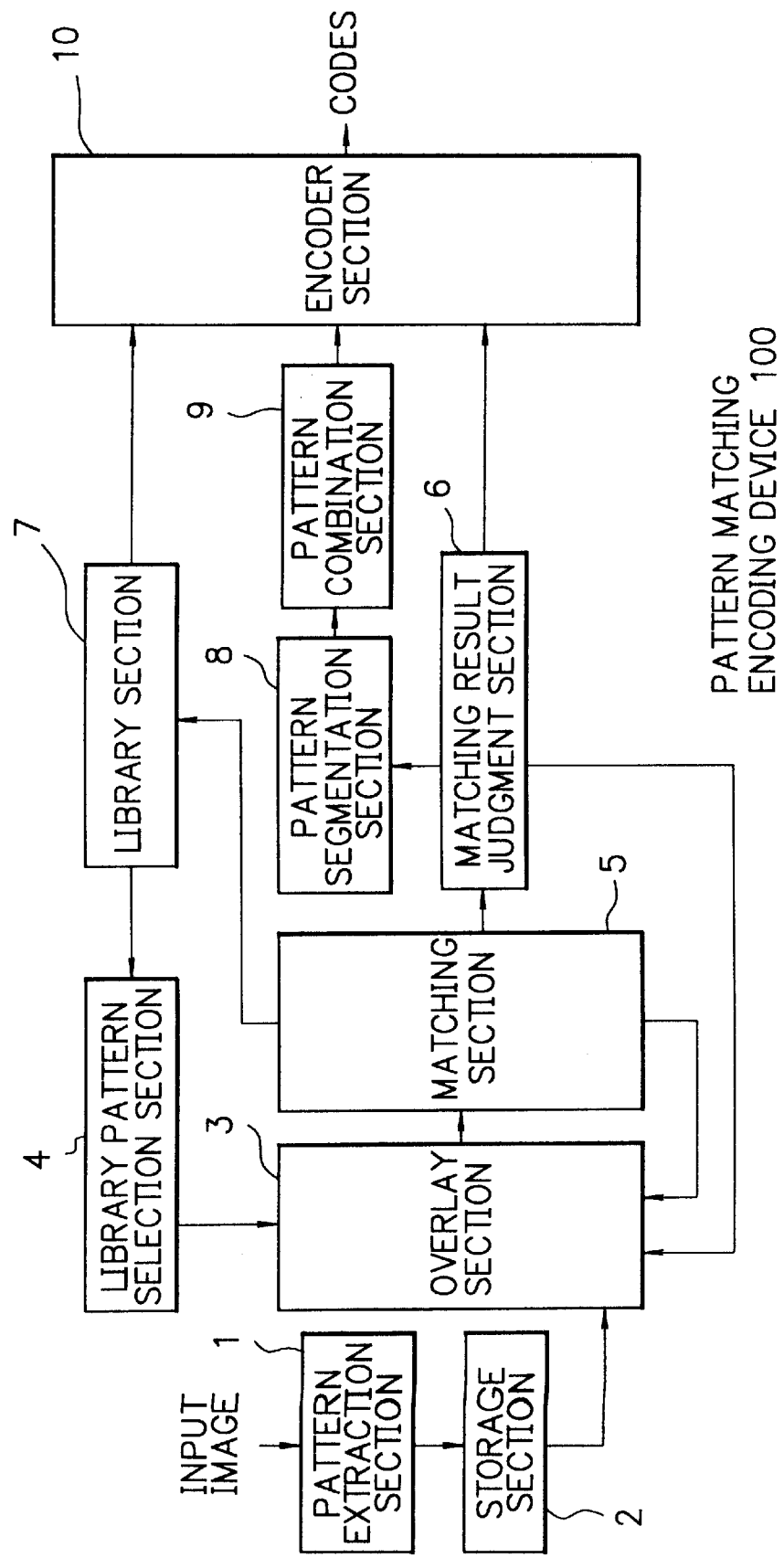
FIG. 2 is a block diagram showing functional blocks of a pattern matching encoding device according to an embodiment of the present invention.

FIG. 2 is a block diagram showing functional blocks of a pattern matching encoding device 100 according to an embodiment of the present invention. The pattern matching encoding device 100 of FIG. 2 comprises a pattern extraction section 1, a storage section 2, an overlay section 3, a library pattern selection section 4, a matching section 5, a matching result judgment section 6, a library section 7, a pattern segmentation section 8, a pattern combination section 9, and an encoder section 10.

The pattern extraction section 1 extracts input patterns by segmenting an inputted binary image (i.e. an input image) into patterns corresponding to letters, numbers, symbols, etc. Here, various kinds of known methods can be employed for the pattern extraction, such as boundary tracing method, projection segmentation method, etc. The storage section 2 stores the input patterns which have been extracted by the pattern extraction section 1. The overlay section 3 registers and overlays an input pattern and a library pattern by adjusting the size, direction, position of the patterns in order to prepare for the pattern matching. The library pattern selection section 4 selects library patterns to be used for the pattern matching, from the library section 7. The matching section 5 executes the pattern matching between each input pattern and the library patterns. The matching result judgment section 6 judges the result of the pattern matching and determines subsequent processes according to the judgment. The library section 7 stores a plurality of library patterns created so far in order to prepare for pattern matching against input patterns. The pattern segmentation section 8 segments the library pattern according to the result of the pattern matching. The pattern combination section 9 generates a new library pattern by combining the segmented library patterns. The encoder section 10 executes encoding process according to the result of the pattern matching.

Incidentally, the library section 7 and the storage section 2 are realized by, for example, one or more storage devices such as a RAM (Random Access Memory), an HDD (Hard Disk Drive), an MO (Magneto-Optical disk), etc. The pattern extraction section 1, the alignment section 3, the library pattern selection section 4, the matching section 5, the matching result judgment section 6, the pattern segmentation section 8, the pattern combination section 9, and the encoder section 10 are realized by, for example, a microprocessor unit which is composed of a CPU, ROM (Read Only Memory), RAM, etc., and necessary software. Such software (program) for realizing processes of the pattern matching encoding device 100 is stored in one or more record mediums.

In the following, the operation of the pattern matching encoding device 100 will be described referring to FIG. 3. FIG. 3 is a flow chart showing the operation of the pattern matching encoding device 100.

Binary image data (i.e. the input image) which has been supplied to the pattern matching encoding device 100 is segmented into a plurality of patterns and the segmented patterns are extracted as input patterns by the pattern extraction section 1 (step S0).

The input patterns extracted by the pattern extraction section 1 are stored one after another in the storage section 2. The pattern matching is executed with respect to each of the input patterns which has been stored in the storage section 2. In the pattern matching for an input pattern, the library pattern selection section 4 selects the library patterns stored in the library section 7 which have approximately the same size as the input pattern (step S1). Incidentally, in the following, the selected library patterns which have approximately the same size as the input pattern is referred to as 'same size library patterns'. After the register (overlay) between the input pattern and each of the same size library patterns has been completed by the overlay section 3 so that the center line of the same size library pattern will overlap with the center line of the input pattern, general pattern matching between the input pattern and the library pattern is executed by the matching section 5 (step S2).

The result of the pattern matching is judged by the matching result judgment section 6 (step S3). If some same size library patterns which match the input pattern were found, the input pattern is registered in the library section 7 as a library pattern and thus the library section 7 is updated (step S4), and the input pattern and the matched library pattern which matched the input pattern best are sent to the encoder section 10. Then, the input pattern is encoded by means of arithmetic coding using the matched library pattern as the reference pattern (step S5). Incidentally, the update of the library section 7 is executed in the step S4 even if the matched library pattern could be found for the input pattern. This is because the library section 7 with higher matching rate can be prepared by registering similar input patterns too.

If no same size library pattern which matches the input pattern was found in the step S3, another pattern matching is executed with respect to the input pattern. Same size library patterns are selected by the library pattern selection section 4 (step S6), and pattern matching is executed with respect to the input pattern similarly to the pattern matching of the step S2 (step S7). In the pattern matching of the step S7, the overlay between the input pattern and the same size library pattern by the overlay section 3 is executed so that the left ¼ line (the halfway line between the center line and the left-hand edge of the pattern) of the same size library pattern will overlap with the left ¼ line of the input pattern, and then, the pattern matching between the input pattern and the same size library pattern is executed by the matching section 5 with respect to the left-hand sides of the left ¼ lines of the patterns (i.e. with respect to ¼ left-hand parts of the patterns).

The result of the pattern matching of the step S7 is judged by the matching result judgment section 6 (step S8). If no same size library pattern whose ¼ left-hand part matches the ¼ left-hand part of the input pattern was found in the step S8, the input pattern is judged to be an unmatched pattern. The unmatched input pattern is registered in the library section 7 as a library pattern (step S9), and the unmatched input pattern alone is sent to the encoder section 10. The unmatched input pattern is encoded by arithmetic coding without using a library pattern as the reference pattern (step S5).

If some same size library patterns whose ¼ left-hand parts match the ¼ left-hand part of the input pattern were found in the step S8, another pattern matching is executed with respect to the input pattern similarly to the pattern matching of the step S7 (step S10). In the pattern matching of the step S10, the overlay between the input pattern and the same size library pattern by the overlay section 3 is executed so that the left ¼ line of the same size library pattern will overlap with the left ¼ line of the input pattern in the same way as the step S7, and then, the pattern matching between the input pattern and the same size library pattern is executed by the matching section 5 with respect to the right-hand sides of the left ¼ lines of the patterns (i.e. with respect to ¾ right-hand parts of the patterns).

The result of the pattern matching of the step S10 is judged again by the matching result judgment section 6 (step S11). If no same size library pattern whose ¾ right-hand part matches the ¾ right-hand part of the input pattern was found in the step S11, the input pattern is judged to be an unmatched pattern. The unmatched input pattern is registered in the library section 7 as a library pattern (step S9), and the unmatched input pattern alone is sent to the encoder section 10. The unmatched input pattern is encoded by arithmetic coding without using a library pattern as the reference pattern (step S5).

If some same size library patterns whose ¾ right-hand parts match the ¾ right-hand part of the input pattern were found in the step S11, the same size library pattern which matched best in the step S8 and the same size library pattern which matched best in the step S11 (the same size library pattern whose ¼ left-hand part has matched that of the input pattern best and the same size library pattern whose ¾ right-hand part has matched that of the input pattern best) are segmented into two parts respectively (i.e. into the ¼ left-hand parts and the ¾ right-hand parts) by the pattern segmentation section 8 using the left ¼ lines (step S12). Subsequently, the ¼ left-hand part which matched the ¼ left-hand part of the input pattern best and the ¾ right-hand part which matched the ¾ right-hand part of the input pattern best are combined together by the pattern combination section 9, thereby a new library pattern is generated (step S13).

The newly generated library pattern is regarded as a library pattern which matches the input pattern and will be used as the reference pattern in the encoding process. The input pattern is registered in the library section 7 as a library pattern (step S9), and the input pattern and the new library pattern are sent to the encoder section 10. Then the input pattern is encoded using the matched library pattern (i. e. the new library pattern) as the reference pattern (step S5). Incidentally, it is also possible to register the new library pattern in the library section 7 as a library pattern.

In the step S5, the encoder section 10 executes encoding of the input pattern by means of arithmetic coding. In this embodiment, numerical information codes are generated by encoding numerical information concerning the input pattern, as well as pattern codes which are generated by encoding the input pattern itself. The numerical information codes and the pattern codes are outputted by the pattern matching encoding device 100 and are used by a pattern matching decoding device for reconstructing an image. The pattern matching encoding device 100 and the pattern matching decoding device may be installed in facsimile machines for compression of images and reduction of the amount of data.

The numerical information includes the position of the input pattern in the image, the width of the input pattern, the height of the input pattern, a 'matching flag' for indicating whether the input pattern matched any of the library patterns or not, and an index (an address etc.) of the best-matched library pattern (in the case where the input pattern matched some of the library patterns). Further, a 'generation flag' for indicating whether the new library pattern was generated in the step S13 or not is included in the numerical information to be used by the pattern matching decoding device. In the case where the new library pattern was generated (i.e. in the case where the generation flag is ON), two indexes of the library patterns which have been used for generating the new library pattern are necessary, in which one of the two indexes may be expressed by the difference between the two indexes, in order to improve encoding efficiency and compression rate.

As described above, according to the embodiment, in the pattern matching encoding, even in the case where no library pattern which matches the input pattern is found, the input pattern is segmented into the ¼ left-hand part and the ¾ right-hand part, and a library pattern whose ¼ left-hand part match the ¼ left-hand part of the input pattern best and a library pattern whose ¾ right-hand part match the ¾ right-hand part of the input pattern best are searched for. Each of the library patterns is segmented into two parts and the matching parts are combined for generating a new library pattern. Then, the new library pattern is used as the reference pattern in the encoding of the input pattern, thereby the input pattern can be encoded with high encoding efficiency and high compression rate. Therefore, according to the embodiment, encoding of input patterns can be executed with high compression rate even if no library pattern which matches the input pattern is found in the general pattern matching, and thus the library storing the library patterns can be optimized faster with a smaller number of execution of the pattern matching encoding, thereby compression rate of the input patterns by encoding can be increased faster without needing a large number of the execution.

For example, the aforementioned 'kanji' (a Chinese character) used in Japanese is made of parts which are called 'hen' (a left-hand radical of a Chinese character), 'tsukuri' (a right-hand radical of a Chinese character), etc., and each of various kinds of parts are used in a plurality of Chinese characters. Therefore, in the case where the input image is a document including Chinese characters etc., the library section 7 can be optimized faster with a smaller number of execution of the pattern matching encoding, and thus the compression rate of the input patterns can be increased faster. Therefore, the above embodiment is especially effective in the case where each part of patterns is generally used in a plurality of patterns in an image, such as in the case of Japanese documents, etc.

Incidentally, in the above embodiment, the segmentation of patterns was executed so as to segment each pattern into the ¼ left-hand part and the ¾ right-hand part, on the assumption that the input image includes Chinese characters composed of the aforementioned 'hen' (a left-hand radical of a Chinese character) and 'tsukuri' (a right-hand radical of a Chinese character). However, the way of segmentation is not limited to the 1:3 left-right segmentation and various kinds of segmentation is also possible depending on the characteristics of patterns. For example, the segmentation ratio may be 1:1, 1:2, etc., or a pattern may be segmented into an upper part and a lower part, or a pattern may be segmented into three or more parts.

In addition, although the combination pattern matching method according to the present invention (generating a new library pattern by segmentation and combination of library patterns) was employed only when the input pattern did not match any library patterns in the first general pattern matching in the step S2, it is also possible to apply the combination pattern matching method to every input pattern if processing time is allowed to be longer. In such cases, libraries storing segmented library patterns may be used.

Figure 4:
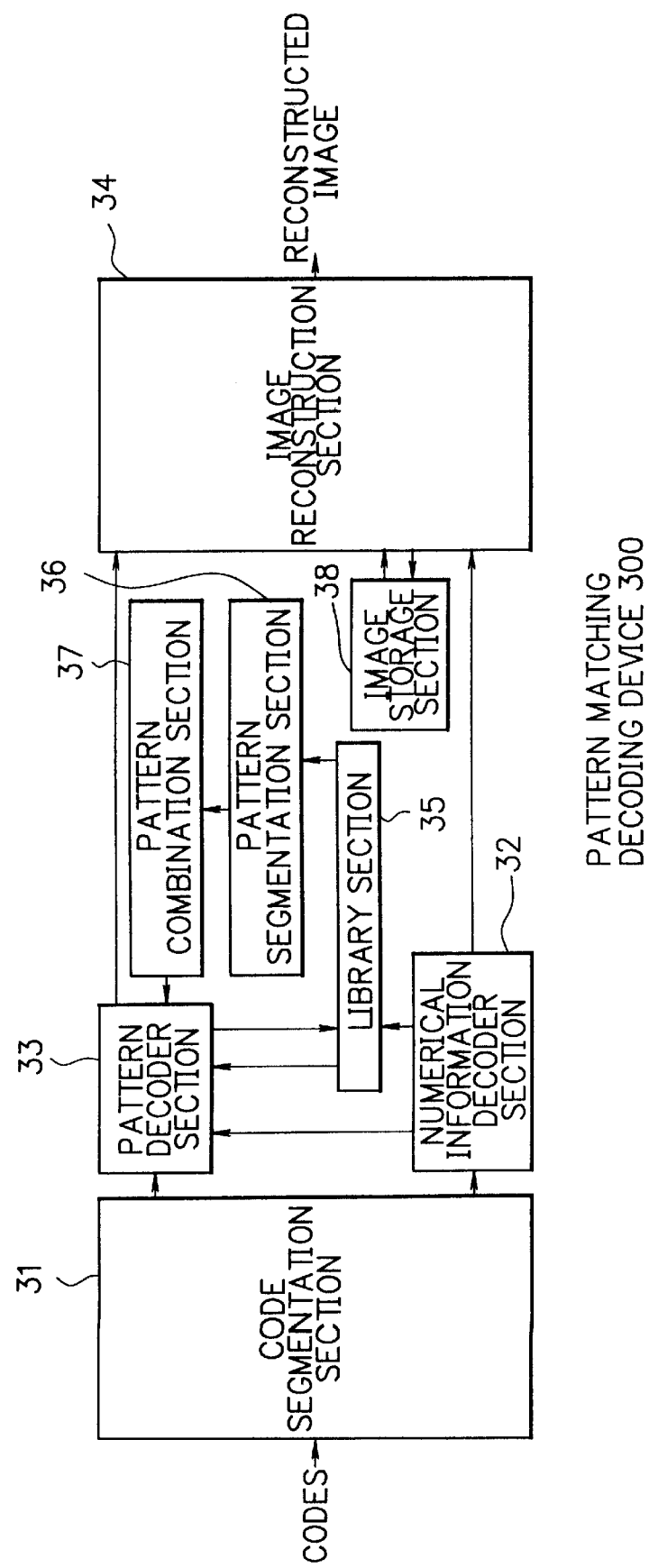
FIG. 4 is a block diagram showing functional blocks of a pattern matching decoding device according to another embodiment of the present invention.

FIG. 4 is a block diagram showing functional blocks of a pattern matching decoding device 300 according to the second embodiment of the present invention. The pattern matching decoding device 300 of FIG. 4 is a device for executing decoding corresponding to the encoding of the pattern matching encoding device 100 of FIG. 2. The pattern matching encoding device 100 and the pattern matching decoding device 300 may be installed in facsimile machines for compression of images and reduction of the amount of data.

The pattern matching decoding device 300 comprises a code segmentation section 31, a numerical information decoder section 32, a pattern decoder section 33, an image reconstruction section 34, a library section 35, a pattern segmentation section 36, a pattern combination section 37, and an image storage section 38.

The code segmentation section 31 segments code which is supplied to the pattern matching decoding device 300 into pattern codes and numerical information codes. The numerical information decoder section 32 decodes the numerical information codes and outputs numerical information. The pattern decoder section 33 decodes the pattern codes and outputs patterns. The image reconstruction section 34 reconstructs images using the patterns decoded by the pattern decoder section 33. The library section 35 stores patterns which are decoded by the pattern decoder section 33 as library patterns one after another, in order to prepare for subsequent pattern decoding. The pattern segmentation section 36 segments the library pattern into parts. The pattern combination section 37 generates a new library pattern by combining the segmented library patterns. The image storage section 38 stores an image which is in the middle of decoding and reconstruction.

Incidentally, the library section 35 and the image storage section 38 are realized by, for example, one or more storage devices such as a RAM (Random Access Memory), an HDD (Hard Disk Drive), an MO (Magneto-Optical disk), etc. The code segmentation section 31, the numerical information decoder section 32, the pattern decoder section 33, the image reconstruction section 34, the pattern segmentation section 36, and the pattern combination section 37 are realized by, for example, a microprocessor unit which is composed of a CPU, ROM (Read Only Memory), RAM, etc., and necessary software. Such software (program) for realizing processes of the pattern matching decoding device 300 is stored in one or more record mediums.

In the first embodiment, the library in the library section 7 of the pattern matching encoding device 100 was constructed as the input patterns are encoded by the encoder section 10 one after another. In this embodiment, the library in the library section 35 of the pattern matching decoding device 300 is constructed as the pattern codes are decoded by the pattern decoder section 33 one after another. Therefore. the library in the library section 35 of the pattern matching decoding device 300 is constructed in the same way as the library section 7 in the pattern matching encoding device 100, as transmission of codes are executed from the pattern matching encoding device 100 to the pattern matching decoding device 300.

Figure 5:
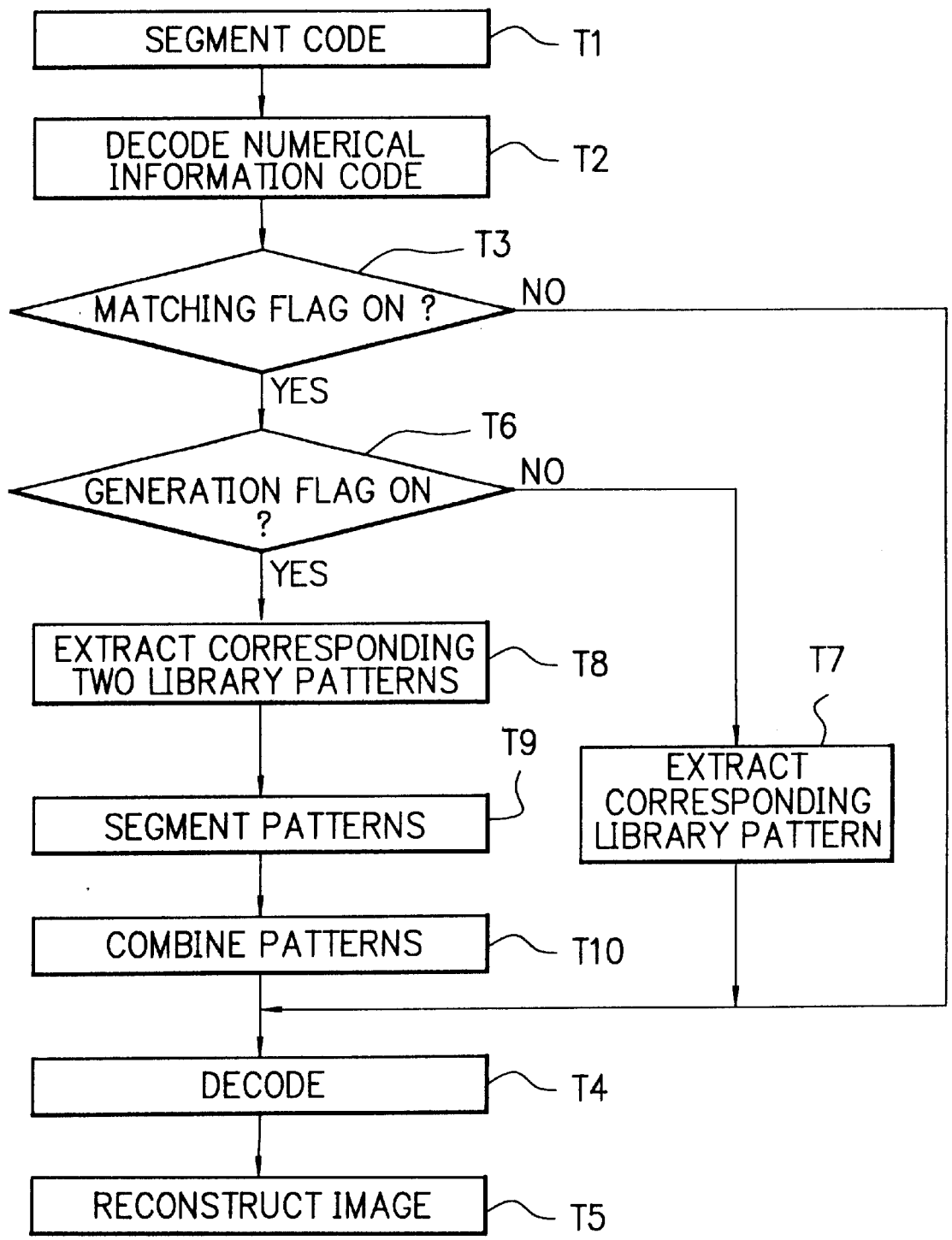
FIG. 5 is a flow chart showing the operation of the pattern matching decoding device of FIG. 4.

In the following, the operation of the pattern matching decoding device 300 will be described referring to FIG. 5. FIG. 5 is a flow chart showing the operation of the pattern matching decoding device 300. Incidentally, in the following, the operation of the device 300 when only one pattern existed in the encoded image will be explained for brevity. However, the operation of the device 300 when a plurality of patterns are included in the encoded image is basically the same.

Code which has been encoded by the pattern matching encoding device 100 is supplied to the code segmentation section 31 and is segmented into pattern code and numerical information code (step T1).

The numerical information code is decoded by the numerical information decoder section 32 (step T2). The subsequent steps will be executed depending on the states of flags in the decoded numerical information.

First, the 'matching flag' is referred to (step T3). If the matching flag is OFF (i.e. if the pattern to be decoded was an unmatched pattern in the encoding process) in the step T3, the pattern code outputted by the code segmentation section 31 is decoded directly by the pattern decoder section 33 using no library pattern as a reference pattern. The decoded pattern is registered in the library section 35 as a library pattern (step T4). Then, image data is reconstructed using the decoded pattern by the image reconstruction section 34 (step T5).

If the matching flag is ON (i.e. if the pattern to be decoded was a matched pattern in the encoding process) in the step T3, the 'generation flag' is referred to next (step T6).

If the generation flag is OFF (i.e. if a library pattern which matches the input pattern was found in the encoding process) in the step T6, the library section 35 extracts a library pattern which corresponds to an index included in the numerical information from the library patterns stored so far (step T7), and the pattern decoder section 33 decodes the pattern code using the extracted library pattern as the reference pattern. The decoded pattern is registered in the library section 35 as a library pattern (step T4). Then, image data is reconstructed using the decoded pattern by the image reconstruction section 34 (step T5).

If the generation flag is ON (i.e. if a library pattern which matches the input pattern was not found but a new library pattern could be generated in the encoding process) in the step T6, the library section 35 extracts two library patterns which correspond to the two indexes included in the numerical information from the library patterns stored so far (step T8). The pattern segmentation section 36 segments the two library patterns into two parts (step T9) and the pattern combination section 37 generates a new library pattern by combining the segmented library patterns (step T10). The pattern decoder section 33 decodes the pattern code using the new library pattern as the reference pattern. The decoded pattern is registered in the library section 35 as a library pattern (step T4). Then, image data is reconstructed using the decoded pattern by the image reconstruction section 34 (step T5).

Incidentally, in the case where a plurality of patterns existed in the encoded image, the image in the middle of decoding and reconstruction is stored in the image storage section 38, and decoded patterns are added one after another to the image stored in the image storage section 38.

As described above, according to the second embodiment, images which have been encoded by the pattern matching encoding device 100 can be decoded using the numerical information including the matching flag, the generation flag, the indexes of library patterns, etc. sent from the pattern matching encoding device 100.

As set forth hereinabove, according to the present invention, encoding and data transmission of binary still images can be executed with high compression rate even if no library pattern which matches the input pattern is found in the general pattern matching, and thus the library storing the library patterns can be optimized faster with a smaller number of execution of the pattern matching encoding, thereby compression rate of the input patterns by encoding can be increased faster without needing a large number of the execution. A high degree of effectiveness can be obtained in the case where each part of patterns is generally used in a plurality of patterns in an image, such as in the case of Japanese documents. etc.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pattern matching encoding device for executing pattern matching encoding of binary still images in which each input pattern extracted from an input image is matched against library patterns which have been registered in a library so far and said input pattern is encoded using a matched library pattern as a reference pattern if said matched library pattern is found, comprising:

library pattern selection means for selecting library patterns which can be matched against said input pattern, from said library patterns which have been registered in said library so far;

pattern segmentation means for segmenting each of said library patterns selected by said library pattern selection means into two or more parts and segmenting said input pattern into two or more parts and thereby generating segmented library patterns and segmented input patterns;

matching means for matching each of said segmented input patterns against corresponding segmented library patterns;

pattern combination means for generating a new library pattern by combining said segmented library patterns each of which has matched one of said segmented input patterns in said matching executed by said matching means; and encoding means for regarding said new library pattern as said matched library pattern and encoding said input pattern using said new library pattern as said reference pattern, wherein if there are no library patterns which match the input pattern, said device attempts to match a portion of the input pattern with the same portion of a library pattern of approximately a same size.

2. A pattern matching encoding device as claimed in claim 1, wherein said pattern segmentation means segments each of said library patterns selected by said library pattern selection means and said input pattern into two parts.

3. A pattern matching encoding device for executing pattern matching encoding of binary still images in which each input pattern extracted from an input image is matched against library patterns which have been registered in a library so far and said input pattern is encoded using a matched library pattern as a reference pattern if said matched library pattern is found, comprising:

library pattern selection means for selecting library patterns which can be matched against said input pattern, from said library patterns which have been registered in said library so far;

pattern segmentation means for segmenting each of said library patterns selected by said library pattern selection means into two or more parts and segmenting said input pattern into two or more parts and thereby generating segmented library patterns and segmented input patterns;

matching means for matching each of said segmented input patterns against corresponding segmented library patterns;

pattern combination means for generating a new library pattern by combining said segmented library patterns each of which has matched one of said segmented input patterns in said matching executed by said matching means; and encoding means for regarding said new library pattern as said matched library pattern and encoding said input pattern using said new library pattern as said reference pattern, wherein said pattern segmentation means segments each of said library patterns selected by said library pattern selection means and said input pattern into two parts, a ¼ left-hand part and a ¾ right-hand part.

4. A pattern matching encoding device as claimed in claim 1, wherein said input pattern is registered as a library pattern in said library.

5. A pattern matching encoding device as claimed in claim 1, wherein said new library pattern generated by said pattern combination means is registered as a library pattern in said library.

6. A pattern matching encoding device as claimed in claim 1, wherein said encoding means executes said encoding of said input pattern by means of arithmetic coding.

7. A pattern matching encoding device as claimed in claim 1, wherein said library pattern selection means selects library patterns which have approximately a same size as said input pattern.

8. A pattern matching encoding device as claimed in claim 1, wherein said encoding means further encodes numerical information concerning said input pattern.

9. A pattern matching encoding device as claimed in claim 8, wherein said numerical information comprises:
- a position and a size of said input pattern in said binary still image;
- a matching flag for indicating whether or not said input pattern has matched any of said library patterns;
- an index of a best-matched library pattern if said input pattern has matched some of said library patterns in general pattern matching;
- a generation flag for indicating whether said new library pattern has been generated by said pattern combination means; and
- indexes of said library patterns which have been used for generating said new library pattern if said new library pattern has been generated by said pattern combination means.

10. A computer-readable record medium storing a program for instructing a computer to execute processes for pattern matching encoding of binary still images in which each input pattern extracted from an input image is matched against library patterns which have been registered in a library so far and said input pattern is encoded using a matched library pattern as a reference pattern if said matched library pattern is found, said processes comprising:
- a library pattern selection process for selecting library patterns which can be matched against said input pattern, from said library patterns which have been registered in the library so far;
- a pattern segmentation process for segmenting each of said library patterns selected in said library pattern selection process into two or more parts and segmenting said input pattern into two or more parts and thereby generating segmented library patterns and segmented input patterns;
- a matching process for matching each of said segmented input patterns against corresponding segmented library patterns;
- a pattern combination process for generating a new library pattern by combining said segmented library patterns each of which has matched one of said segmented input patterns in said matching process; and
- an encoding process for regarding said new library pattern as said matched library pattern and encoding said input pattern using said new library pattern as said reference pattern, wherein if there are no library patterns which match the input pattern, said process attempts to match a portion of the input pattern with the same portion of a library pattern of approximately a same size.

11. A computer-readable record medium as claimed in claim 10, wherein each of said library patterns selected in said library pattern selection process and said input pattern are segmented into two parts in said pattern segmentation process.

12. A computer-readable record medium storing a program for instructing a computer to execute processes for pattern matching encoding of binary still images in which each input pattern extracted from an input image is matched against library patterns which have been registered in a library so far and said input pattern is encoded using a matched library pattern as a reference pattern if said matched library pattern is found, said processes comprising:
- a library pattern selection process for selecting library patterns which can be matched against said input pattern, from said library patterns which have been registered in the library so far;
- a pattern segmentation process for segmenting each of said library patterns selected in said library pattern selection process into two or more parts and segmenting said input pattern into two or more parts and thereby generating segmented library patterns and segmented input patterns;
- a matching process for matching each of said segmented input patterns against corresponding segmented library patterns;
- a pattern combination process for generating a new library pattern by combining said segmented library patterns each of which has matched one of said segmented input patterns in said matching process; and
- an encoding process for regarding said new library pattern as said matched library pattern and encoding said input pattern using said new library pattern as said reference pattern wherein each of said library patterns selected in said library pattern selection process and said input pattern are segmented into two parts in said pattern segmentation process, a ¼ left-hand part and a ¾ right-hand part.

13. A computer-readable record medium as claimed in claim 10, wherein said processes further comprise a new library pattern registration process for registering said input pattern as a library pattern in said library.

14. A computer-readable record medium as claimed in claim 10, wherein said processes further comprise a new library pattern registration process for registering said new library pattern generated in said pattern combination process as said library pattern in said library.

15. A computer-readable record medium as claimed in claim 10, wherein said encoding of said input pattern is executed by means of arithmetic coding in said encoding process.

16. A computer-readable record medium as claimed in claim 10, wherein library patterns which have approximately a same size as said input pattern are selected in said library pattern selection process.

17. A computer-readable record medium as claimed in claim 10, wherein numerical information concerning said input pattern is further encoded in said encoding process.

18. A computer-readable record medium as claimed in claim 17, wherein said numerical information comprises:
- a position and a size of said input pattern in said binary still image;
- a matching flag for indicating whether said input pattern has matched any of said library patterns;
- an index of a best-matched library pattern if said input pattern has matched some of said library patterns in general pattern matching:
- a generation flag for indicating whether said new library pattern has been generated in said pattern combination process; and indexes of said library patterns which have been used for generating said new library pattern if said new library pattern has been generated in said pattern combination process.

19. A pattern matching decoding device for executing pattern matching decoding of code which has been encoded by a pattern matching encoding device according to claim 1, comprising:

library pattern extraction means for extracting two or more library patterns from library patterns which have been registered in said library so far, according to information supplied from said pattern matching encoding device;

library pattern segmentation means for segmenting said library patterns which have been extracted by said library pattern extraction means into two or more parts and thereby generating segmented library patterns;

library pattern combination means for generating a new library pattern by combining the segmented library patterns which have been generated by said library pattern segmentation means, according to information supplied from said pattern matching encoding device; and decoding means for decoding a code which has been encoded by said pattern matching encoding device using said new library pattern as a reference pattern.

20. A computer-readable record medium storing a program for instructing a computer to execute processes for pattern matching decoding of code which has been encoded by a pattern matching encoding device according to claim 1, wherein said processes comprise:

a library pattern extraction process for extracting two or more library patterns from library patterns which have been registered in said library so far, according to information supplied from said pattern matching encoding device;

a library pattern segmentation process for segmenting each of said library patterns which have been extracted in said library pattern extraction process into two or more parts and thereby generating segmented library patterns;

a library pattern combination process for generating a new library pattern by combining said segmented library patterns which have been generated in said library pattern segmentation process, according to information supplied from said pattern matching encoding device; and a decoding process for decoding a code which has been encoded by said pattern matching encoding said device using said new library pattern as a reference pattern.

* * * * *